Feb. 10, 1953
R. D. ACTON
2,627,797
GAUGE MEANS FOR IMPLEMENTS
Filed July 3, 1946
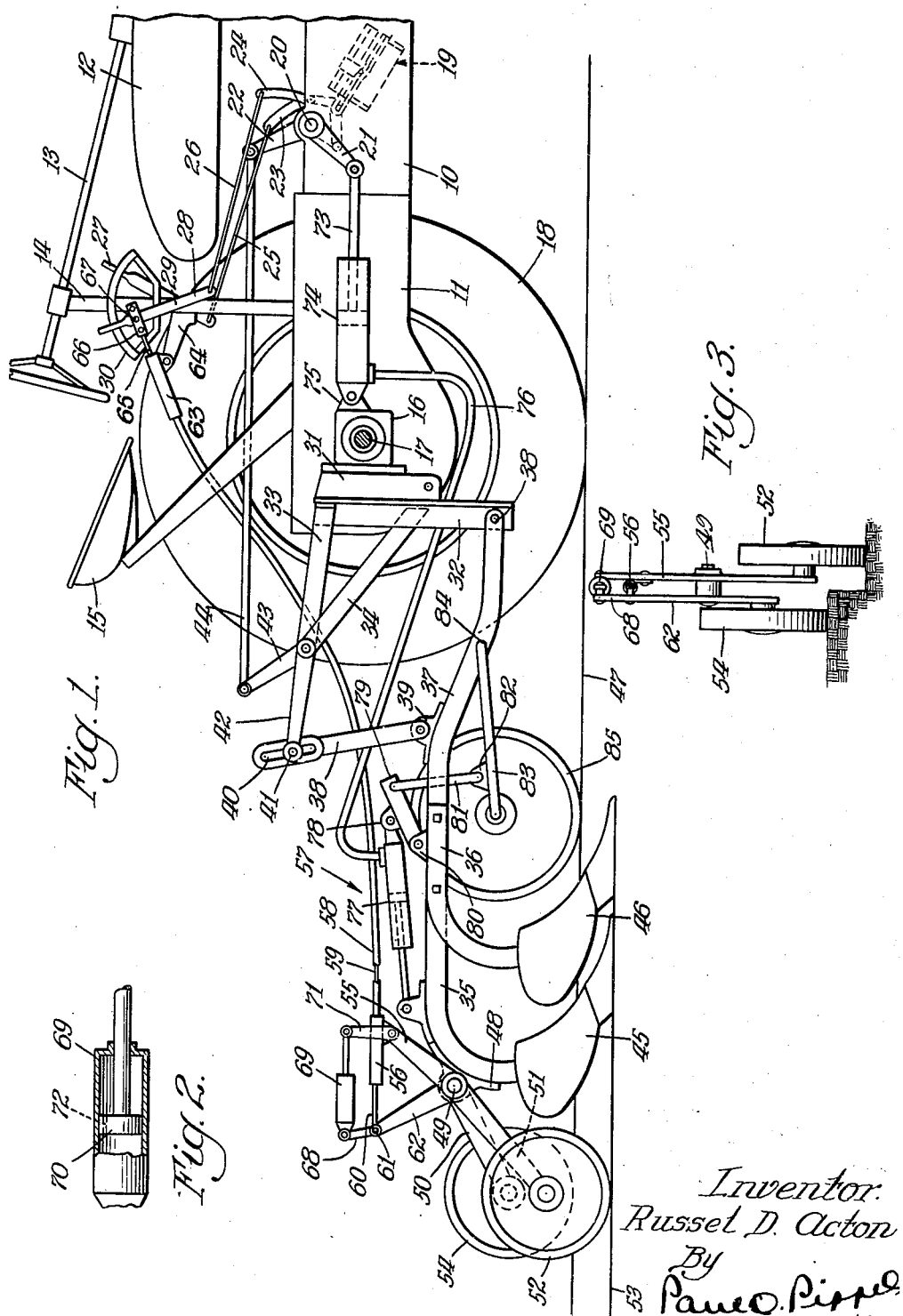
Inventor:
Russel D. Acton
By
Paul O. Pippel
Atty.

Patented Feb. 10, 1953

2,627,797

UNITED STATES PATENT OFFICE 2,627,797

GAUGE MEANS FOR IMPLEMENTS

Russel D. Acton, Chicago, Ill.

Application July 3, 1946, Serial No. 681,335

11 Claims. (Cl. 97—50)

This invention relates to a gauge means for tractor-connected implements. More specifically it relates to a differential gauge means particularly adapted for tail-behind plows or similar implements adapted to be connected to a tractor having power lift mechanisms mounted thereon.

To facilitate the operation and control of tractor-mounted implements, various types of power lift mechanisms have been built into tractors or provided as attachments therefor. Said power lift mechanisms are actuated from the power plant of the tractor and usually incorporate a rock-shaft located on the tractor and angularly movable by the power lift mechanism to adjust implements connected to the tractor.

Certain implements cannot be satisfactorily mounted entirely on the tractor and are drawn by the tractor mounted for floating movement with respect thereto. With implements of this type it is desirable to have an independent gauge means carried by the implement frame for adjusting the working depth thereof.

A principle object of the present invention is to provide an automatic gauge means for a tractor-connected implement.

A more specific object is to provide an automatic gauge means for a power-operated depth adjusting device incorporated as a part of a tractor-connected implement.

Another specific object is to utilize a power lift device mounted on a tractor for operating a flexible power transmitting device connected with the adjusting means of a trail-behind implement and to provide additional differential gauge mechanism for operating the tractor power lift mechanism to regulate the implement adjusting means.

The above objects and others which will be apparent from the detailed description to follow are accomplished by a construction as shown in the drawings, in which:

Figure 1 is a side elevation of a tractor having one wheel removed and a trail-behind implement connected to the tractor.

Figure 2 is an enlarged detail view partly in section, showing a dash-pot device incorporated in Figure 1.

Figure 3 is a rear elevation showing the differential gauge structure which is mounted at the rear of the implement shown in Figure 1.

In the drawings, the rear portion of a conventional tractor is diagrammatically illustrated. The parts of the tractor shown include a central frame portion 10 connected with a rearwardly extending transmission and final drive casing 11, a gasoline tank and hood structure 12, a steering shaft 13, a support 14 for the steering shaft, and an operator's seat 15. The casing 11 is provided with laterally extending rear axle housings 16, one of which can be seen in Figure 1, a drive axle 17 also being shown projecting from said axle housing. One traction wheel 18 can also be seen, the other being removed to better show the attaching means for the various parts.

In Figure 1 a hydraulic power lift cylinder assembly 19 is illustrated in dotted lines, said structure being only indicative of a type of mechanism which may be utilized to oscillate a rock-shaft 20 which extends transversely across the tractor carrying a power lift arm 21 at one side of the tractor. It is also contemplated that another mechanism will be utilized for independently oscillating a second lifting arm 22 mounted at the other side of the tractor. Control means for the independent lift mechanisms are indicated by the actuating levers 23 and 24 extending above the body portion 10 of the tractor. Said actuating arms are connected respectively by rods 25 and 26 with control means in the form of levers 27 and 28 pivoted at 29 on the steering shaft support 14. Said levers slide over a sector 30 and are provided with extensions above said sector for manual operation. This type of power lift mechanism including the control levers is well known and has been shown only to such an extent as is necessary to show its cooperation with the differential gauge means which forms applicant's invention.

A draft structure including a vertical angle bar 31, a vertical angle bar 32, a rearwardly extending member 33, and a brace member 34 is connected by any suitable means to the axle housing 16 projecting rearwardly therefrom.

The implement diagrammatically illustrated includes plow beams 35 and 36 which are connected to a draft frame 37 pivotally connected at 38 to the lower end of the angle bar 32. A lifting link 38 pivotally connected to a bracket 39 on the draft frame 37 is provided at its upper end with a slot 40 in which a pin 41 carried by a lifting arm 42 is slidable within the limits permitted by the slot. The lifting arm 42 is a part of a bell-crank structure including an arm 43 which is pivotally connected by a link 44 with the lifting arm 22 on the tractor. By means of this lifting linkage the entire implement may be lifted free from the ground for transport or for maneuvering the tractor during operation. It is understood that the lifting arm 22 is controlled by the actuating element 23, the rod 25, and the lever 27.

The beams 35 and 36 carry plow bottoms 45 and 46 which are shown as operating a considerable distance below the surface of the ground on which the tractor operates as illustrated by the ground line 47.

At the rear of the beam 35 a bracket 48 is secured to provide a support for a transverse pin 49 on which spaced downwardly and rearwardly extending members 50 and 51 are pivotally mounted. The member 51 carries a wheel 52 adapted to ride in the furrow made by the plow bottom 45. Said wheel is preferably made of a casting or other material having considerable weight so that it will follow the surface 53 indicated as being the bottom of the furrow. The other arm 50 carries a wheel 54 adapted to operate along the surface of the ground. The different levels traversed by the wheels 52 and 54 indicate the depth of operation of the plow.

The member 51 carries an extension arm 55 on which a fitting 56 of a flexible power transmitting unit, indicated in its entirety by the reference character 57, is pivoted. Said power transmitting member, as indicated by the broken-away section adjacent the fitting 56, includes an outside flexible sheath 58 and an inner flexible cable 59. This is the type of construction ordinarily referred to as a Bowden wire. Within the fitting 56 the cable 59 is connected to a plunger member 60 which is guided by said fitting. Said member is pivotally connected at 61 to an extension arm 62 of the member 59.

The other end of the flexible power transmitting unit 57 is provided with a fitting 63 which is pivotally secured to a bracket 64 carried by the support 14. A piston member 65 projecting from the fitting 63 and connected to the cable 59 therewithin is provided with an apertured member 66 which may be fitted with any one of the apertures in engagement with a pin 67 carried by the control lever 28. By engaging various of said apertures on the pin, the relative adjustment of the power lift with the differential gauge means may be provided.

An extension 68 from the arm 62 provides a pivotal point of attachment for a small cylinder 69. A piston 70 mounted for reciprocation in said cylinder is pivotally connected to an extension 71 from the arm 55. As illustrated in Figure 2, the head of the piston 70 is provided with a bleed opening 72 extending therethrough. It is to be understood that the cylinder 69 is packed for two-way operation of the piston whereby a two-way dash-pot is formed, the size of the opening 72 regulating the speed with which the piston can be moved by a given force in either direction. The purpose of this dash-pot construction is to incorporate a delayed action device on the differential gauge means so that whenever either of the wheels 54 or 52 drops into a small depression or rides over a short obstruction such as a stone, there will be little or no relative movement between the arms 55 and 62. However, if the change in levels at which said wheels operate is of any substantial duration, the dash-pot will offer very little resistance and the arms 55 and 62 will move relative to each other an angular distance corresponding to the change in vertical spacing between the ground-contacting portions of the wheels 52 and 54.

It will be understood that any change in relative vertical spacing of the wheels 52 and 54, except for the time lag provided by the dash-pot construction, will be transmitted through the cable 59 to the control lever 28. Movement of the control lever 28 is translated by the power lift of the tractor to the lifting arm 21. Said arm is pivotally connected to a piston member 73 mounted for reciprocation in a cylinder member 74 which is pivotally connected to a bracket 75 on the tractor axle housing 16. Fluid compressed in said cylinder is delivered through a flexible conduit 76 to a cylinder member 77 pivotally connected to a bracket 78 mounted on a rockable member 79 pivoted on a bracket 80 secured to a portion of the implement frame structure. A link 81 pivotally connected with the member 79 is also pivotally connected to a bracket 82 secured to a swinging arm 83 pivoted at 84 on the draft frame structure 37 of the implement. The swinging arm 83 carries a gauge wheel 85 mounted for reciprocation on a transverse axis and is adapted to be operated on the ground level ahead of the forward plow bottom 46.

It will be understood that liquid delivered under pressure through the flexible conduit 76 will operate the member 79 in an angular direction to move the gauge wheel 85 relative to the implement frame structure so as to lift the plow bottoms and regulate their operating depth. When the lifting arm 21 moves in the other direction, the plow bottoms are correspondingly moved downwardly and to a greater working depth.

The differential gauge wheels 52 and 54, by means of their connection through the power transmitting unit 57, actuate directly the control lever 28 and thereby through the power lift arm 21 and the associated power transmitting mechanism automatically adjust the working depth of the plow to maintain it at any desired depth at which it is initially set to operate.

The supporting members 50 and 51 are pivoted on the pin 49 which is carried by the plow frame. The pivot axis is a considerable distance ahead of the contact points of the wheels 52 and 54 with the plowed and unplowed ground. Movement of the pin 49 in vertical up and down directions due to tilting of the plow frame and tilting of the tractor only slightly affects the relative positions of the wheels 52 and 54 and the depth-of-cut gauge means, which the relative movement of said wheels operate. By this structure, the effective depth of plowing as accomplished is continually and accurately determined, and is employed to regulate the plowed depth gauge means.

The arms 55 and 62 move relative to each other with relative movement of the wheels 52 and 54, thereby indicating the depth of plowing. The fitting 56 being pivotally connected to the arm 55 acts as a guide for the plunger member 60, whereby the relative movement between the fitting 56 and the member 60 indicates the plowing depth. In the illustrated embodiment, this relative movement is relayed by force transmitting means including a flexible conduit and pressure transmitting means consisting of a flexible cable to the control lever 29 on the tractor, which in turn controls the plowing depth.

Applicant has shown and described a preferred embodiment of his improved gauge means for tractor-connected earth-working implements. It is understood, however, that all modifications falling within the scope of the appended claims are contemplated as a part of the invention.

What is claimed is:

1. A depth control device for an implement having a ground-engaging part and movable gauge means carried by the implement for regulating the ground-engaging part; comprising two members pivoted to the implement, a ground-engaging wheel carried on one of said members and adapted to operate on a surface altered by said implement part, said other member having a wheel mounted thereon and positioned to engage an untreated portion of the ground, an element connected to one of said members, a second element connected to the other of said members, said elements being constructed and arranged to move relative to one another upon relative movement of the wheels and force-transmitting means connected between said elements and to the gauge means operative to control the gauge means by relative movement between the members.

2. A device as set forth in claim 1 in which a dash-pot means is interposed between the two wheel-carrying members.

3. A depth control device for an implement having a ground-engaging part and movable gauge means carried by the implement for regulating the ground-engaging part; comprising two members pivoted to the implement, a ground-engaging wheel carried on one of said members and adapted to operate on a surface altered by said implement part, said other member having a wheel mounted thereon and positioned to engage an untreated portion of the ground whereby the relative movement between said wheels indicates the difference in depth between the untreated surface of the ground and the altered surface, lever arms extending respectively from said members in spaced relation with respect to each other, and force transmitting means constructed and arranged to be moved in proportion to the relative movement between the two lever arms, said force transmitting means including an element operatively connected to the gauge means to modify the plowing depth by relative movement of said ground-engaging wheels.

4. A device as set forth in claim 3 in which a dash-pot means is interposed between the lever arms.

5. A depth control device for a tractor-attached implement combination including a tractor, a power-lift mechanism on said tractor, control means positionable to regulate the position of the power-lift mechanism, an implement pivotally connected to the tractor, a ground-engaging part carried by said implement, movable gauge means carried by the implement for regulating the operative position of the ground-engaging part, and means connecting said gauge means to the power-lift mechanism on the tractor, whereby said gauge means may be adjusted by said power-lift means as determined by the control means associated therewith; comprising two members independently pivoted to the implement, a ground-engaging wheel carried on one of said members and adapted to operate on a surface altered by said ground-engaging implement part, said other member having a wheel mounted thereon and positioned to engage an untreated portion of the ground, and a flexible power transmitting device having at one end two relatively movable parts, one connected to each of said members, said flexible power transmitting device at its other end having two relatively movable members, one secured to the tractor and the other connected to said control means.

6. A device as set forth in claim 5 in which a dash-pot means is interposed between the two wheel-supporting members.

7. A device as set forth in claim 5 in which adjustable extensible means are provided in the power transmitting device constructed and arranged to alter the working range of the depth control device.

8. A depth control device for a tractor-attached implement combination including a tractor, a power-lift mechanism on said tractor, control means positionable to regulate the position of the power-lift mechanism, an implement pivotally connected to the tractor, a ground-engaging part carried by said implement, movable gauge means carried by the implement for regulating the operative position of the ground-engaging part, and means connecting said gauge means to the power-lift mechanism on the tractor, whereby said gauge means may be adjusted by said power-lift means as determined by the control means associated therewith; comprising two members independently pivoted to the implement on the same axis, a ground-engaging wheel carried on one of said members and adapted to operate on a surface altered by said ground-engaging implement part, said other member having a wheel mounted thereon and positioned to engage an untreated portion of the ground, lever arms extending respectively from said members in spaced relation with respect to each other, and a flexible power transmitting device having at one end two relatively movable parts, one connected to each of said spaced lever arms, said flexible power transmitting device at its other end having two relatively movable members, one fixed to a bracket structure secured to the tractor and the other connected to said control means, whereby relative movement of said ground-engaging wheels, which movement determines a varying characteristic of the result of operation of the ground-engaging implement part, is transmitted to the power-lift device for altering the position of the gauge means and thereby altering the working position of the implement part.

9. A depth control device for a tractor-attached implement combination including a tractor, a power-lift mechanism on said tractor, control means positionable to control the position of the power-lift mechanism, a plow frame pivotally connected to the tractor in trail-behind position, a plow carried by said frame, movable gauge means carried by the implement for regulating the ground-engaging part, and means connecting said gauge means to the power-lift mechanism on the tractor, whereby said gauge means may be adjusted by said power-lift means and the manual control means associated therewith; comprising two members pivoted to the plow frame on the same axis, a ground-engaging wheel carried on one of said members and adapted to operate at the bottom of the furrow made by the plow, the other member being adapted to operate on the normal surface of the ground spaced above the bottom of the furrow, lever arms extending respectively from said members in spaced relation with respect to each other, and a flexible power transmitting device having at one end two relatively movable parts, one part being connected to each of said spaced lever arms, said flexible power transmitting device at its other end having two relatively movable members, one member being fixed to a bracket structure secured to the tractor and the other member being connected to said control means, whereby relative movement of said ground-engaging wheels, which movement determines the depth of the furrow, is transmitted to the power-lift device for altering the position of the implement.

10. A device as set forth in claim 9 in which a dash-pot means is interposed between the two wheel-supporting members.

11. A device as set forth in claim 9 in which adjustable extensible means are provided in the power transmitting device constructed and arranged to alter the working range of the depth control device.

RUSSEL D. ACTON.

REFERENCES CITED

The following references are of record in the file of this patent:

UNITED STATES PATENTS

| Number | Name | Date |
|---|---|---|
| 2,023,053 | Kugel | Dec. 3, 1935 |
| 2,292,961 | Mott | Aug. 11, 1942 |
| 2,318,194 | Brown | May 4, 1943 |
| 2,405,334 | Silver | Aug. 6, 1946 |
| 2,410,918 | Acton | Nov. 12, 1946 |

FOREIGN PATENTS

| Number | Country | Date |
|---|---|---|
| 519,394 | Great Britain | Mar. 26, 1940 |
| 520,484 | Great Britain | Apr. 25, 1940 |
| 541,436 | Great Britain | Nov. 26, 1941 |